UNITED STATES PATENT OFFICE.

HERMANN REISENEGGER, OF HÖCHST-ON-THE-MAIN, GERMANY, ASSIGNOR TO THE FARBWERKE, VORMALS MEISTER, LUCIUS & BRÜNING, OF SAME PLACE.

BLACK DYE.

SPECIFICATION forming part of Letters Patent No. 450,037, dated April 7, 1891.

Application filed May 8, 1890. Serial No. 351,079. (No specimens.)

*To all whom it may concern:*

Be it known that I, HERMANN REISENEGGER, doctor of philosophy, a citizen of the Empire of Germany, residing at Höchst-on-the-Main, in the Empire of Germany, have invented certain new and useful Improvements in the Production of Black Coloring-Matter; and I do hereby declare the following to be a full, clear, and exact description of the invention, such as will enable others skilled in the art to which it appertains to make and use the same.

This invention relates to the production of black coloring-matter from amidoflavopurpurine or amidoanthrapurpurine. From flavopurpurine can be prepared by nitration and suitable treatment of the beta-nitroflavopurpurine obtained with reducing agents an amidoflavopurpurine $C_{14}H_7O_5NH_2$, from which, by treatment with glycerine, sulphuric acid, and an oxidizing agent, is obtained the corresponding quinoline compound.

In order to produce the quinoline compound, one part of amidoflavopurpurine in powder is dissolved in seven parts of sulphuric acid of 66°, and thereto is added one-half part of glycerine and one-half part of nitrobenzol. The whole is heated slowly to 110° centigrade and kept at this temperature for eight hours. The melt is pressed into cold water, and the sulphate, which will separate, is decomposed into the free base by filtration and washing with water. In order to obtain from this raw material the quinoline in a pure state, use is made of the property possessed by it of forming with bisulphite of soda a compound that is easily soluble in water. The bisulphite solution is liberated from the impurities it may contain by filtration, and the quinoline is precipitated by sursaturation with common salt or sulphuric acid. It is filtered off, washed, and may be used as coloring-matter by itself or in admixture with bisulphite in solution for dyeing wool and printing on cotton.

The novel coloring-matter can be distintinguished already by its appearance from alizarine-blue, its color varying from violet-brown to black, (in paste,) whereas the latter is blue. Dyed on wool or printed on cotton it furnishes gray to black shades, according to the larger or smaller quantity used. It dissolves in bisulphite more readily than the alizarine-blue, and it is not possible to separate it from its moderately-concentrated bisulphite solutions by the addition of soda-lye in the form of a soda salt, soluble with difficulty, as is the case with alizarine-blue, and this by reason that the coloring-matter is of easy solubility in soda-lye, showing violet-red coloration.

With acids the coloring-matter forms salts; but they are soluble in water with greater difficulty than those of alizarine-blue. By continued washing with water they are also decomposed into the base and the acid. In the solvents generally used for anthraquinone derivatives it is of difficult solubility. From its hot solution in naphtha, alcohol, amyl-alcohol, acetylacetic ether, or carbolic acid it precipitates in form of greenish-black flakes, which, however, do not disclose crystalline form even when greatly magnified. Heated carefully the body melts and afterward sublimes in form of microscopic small needles with greenish luster. Heated in alkaline solution with zinc-dust it furnishes, like alizarine-blue, a dye-vat. Heated one part quickly in a tube with twenty parts of zinc-dust it is converted into the anthraquinoline described by Gräebe. In exactly the same way as is produced from beta-nitroflavopurpurine beta-amido flavopurpurine, and from this the quinoline, amido-anthrapurpurine and its quinoline are produced from beta-nitroanthrapurpurine.

The anthrapurpurine quinoline is as regards its chemical and physical qualities very similar to the flavopurpurine quinoline described hereinbefore, only it gives more bluish shades on being dyed on wool or printed on cotton.

What I claim as my invention, and wish to secure by Letters Patent, is—

As a new article of manufacture, the quinoline compound derived from amido-purpurine, which is a black basic dye or paste, soluble in soda-lye with violet-red color, subliming on heating in small green needles, and when heated quickly in a tube with twenty parts of zinc-dust it is converted into the anthraquinoline described by Gräebe.

In testimony whereof I affix my signature in presence of two witnesses.

HERMANN REISENEGGER.

Witnesses:
   JOSEF REVERDY,
   HEINRICH HAHN.